US006499054B1

(12) United States Patent
Hesselink et al.

(10) Patent No.: US 6,499,054 B1
(45) Date of Patent: Dec. 24, 2002

(54) CONTROL AND OBSERVATION OF PHYSICAL DEVICES, EQUIPMENT AND PROCESSES BY MULTIPLE USERS OVER COMPUTER NETWORKS

(75) Inventors: Lambertus Hesselink, Atherton, CA (US); Dharmarus Rizal, Palo Alto, CA (US); Eric S. Bjornson, Mountain View, CA (US)

(73) Assignee: Senvid, Inc., Woodside, CA (US)

( * ) Notice: Subject to any disclaimer, the term of this patent is extended or adjusted under 35 U.S.C. 154(b) by 0 days.

(21) Appl. No.: 09/454,178

(22) Filed: Dec. 2, 1999

(51) Int. Cl.[7] .............................................. G06F 15/16
(52) U.S. Cl. ...................................... 709/204; 709/231
(58) Field of Search ................................ 709/217, 218, 709/219, 204, 205, 231; 382/110, 133; 434/276

(56) References Cited

U.S. PATENT DOCUMENTS

| | | | | |
|---|---|---|---|---|
| 5,805,442 A | * | 9/1998 | Crater et al. | 709/219 X |
| 5,930,473 A | * | 7/1999 | Teng et al. | 709/204 |
| 5,974,446 A | * | 10/1999 | Sonnenreich et al. | 709/204 |
| 5,982,362 A | * | 11/1999 | Crater et al. | 709/219 X |
| 6,014,451 A | * | 1/2000 | Berry et al. | 382/110 |
| 6,078,961 A | * | 6/2000 | Mourad et al. | 709/235 |
| 6,101,265 A | * | 8/2000 | Bacus et al. | 382/133 |
| 6,105,067 A | * | 8/2000 | Batra | 709/227 |
| 6,261,103 B1 | * | 7/2001 | Stephens et al. | 434/276 |

OTHER PUBLICATIONS

Ronald Scharf et al., Using Mosaic for Remote Test System Control Supports Distributed Engineering, 2nd International WWW Conference Mosaic and the Web, NCSA, 9 pgs, Oct. 1994.*

Ken Goldberg et al., Beyond the Web: manipulating the real world, Computer Networks and ISDN Systems, vol. 28, pp. 209–219, Dec. 1995.*

Kouji Nishimura et al., Real–Time Camera Control for Videoconferencing over the Internet, 5th International Conference on Real–Time Computing Systems and Applications, pp. 121–124, Oct. 1998.*

Jim Henry, Controls Laboratory Teaching via the World Wide Web, ASEE, Jun. 1996, 4 pages.*

Jim Henry, Laboratory Teaching via the World Wide Web, ASEE Southeastern Section Paper, Apr. 1998, 11 pages.*

Internet cite http://www.ni.com/labview/; LabVIEW from National Instruments; dated Jan. 18, 2000; p. 1 of 1.

National Instruments Manual entitled *LabVIEW—Instrumentation and Analysis Software*; pp. 61, 63, 75 & 76; 01/00.

* cited by examiner

*Primary Examiner*—Patrice Winder
(74) *Attorney, Agent, or Firm*—Alan W. Cannon; Bozicevic, Field & Francis LLP (57) ABSTRACT

A method and system for enabling multiple users from different physical locations to access, observe, control and manipulate physical processes and devices over a computer network such as the Internet is disclosed. A user may visually monitor the physical set up and state of an experiment or environment by receiving live video and data, as well as directly control instrumentation while receiving live feedback regarding the input commands. Measurement data may be collected into a database and computational analysis can be generated and displayed as a physical process is being performed. An online interactive laboratory notebook is also provided that manages items such as collected data, laboratory parameters, "to do" lists, personal notes, etc.

1 Claim, 9 Drawing Sheets

FIG.8A
CLIENT TO LAB SERVER

FIG.8B
LAB SERVER TO CLIENT

FIG.8C
CLIENT TO CLIENT

FIG.8D
CLIENT TO MULTI-CLIENTS

FIG.8E
LAB SERVER TO MULTI-CLIENTS

FIG.8F
CLIENT TO MULTI-CLIENTS AND LAB SERVER

CONTROL AND OBSERVATION OF PHYSICAL DEVICES, EQUIPMENT AND PROCESSES BY MULTIPLE USERS OVER COMPUTER NETWORKS

FIELD OF THE INVENTION

The present invention relates broadly to telecommunications and remote control of physical processes in a laboratory. More specifically, the present invention relates to the control of physical processes in a laboratory via a computer network.

BACKGROUND OF THE INVENTION

Distance learning is an exploding field that is driven by the Internet revolution. A key component of current distance learning implementations in science and engineering, however, is missing: laboratory experimentation. Experimental demonstrations in class enhance the learning experience, and provide a sense of realism to complex theoretical concepts. However, cost is an obstacle. Many universities, colleges, high schools and primary schools lack sufficient resources to implement laboratory experiments. Not only is the cost of equipment a significant factor, but labor costs associated with staffing a laboratory are also considerably high. Without a laboratory component distance learning programs are not only inferior to classical education methods, but the programs cannot satisfy basic accreditation criteria. Classical laboratory teaching programs are costly, as highly trained personnel are needed to design, implement and maintain them, while infrequent use contributes to large fixed costs. Thus, science courses requiring laboratory experimentation are a significant obstacle to distance learning applications.

One of the strongest features of a global computer network such as the Internet is the ability to provide multiple users with many-to-one access to resources. A laboratory is the type of resource that is easily used by many, and far more people in the world have access to a computer connected to the Internet than have access to a laboratory. However, In order to conduct physical processes in a laboratory environment, feedback from the physical processes such as equipment operation as well as data collection must be provided to the student or other user with minimal delay. Thus, it is the "look and feel" of a laboratory that must be accurately reproduced if a laboratory is to be accessed via the Internet. Not only does a laboratory user need to collect and analyze data quickly to manipulate physical processes in a laboratory, but he or she also must be able to see what is happening during the process.

Transporting video data in real time across the Internet is a major obstacle for applications such as the online laboratory. The sheer volume of data that is required to be sent often experiences delays that make online laboratory experiments difficult if not impossible to implement.

Thus there is a need for a system and method that allow users to manipulate via a computer network physical processes conducted in remotely located laboratories and provide data and video feedback during the physical process with minimal delay.

SUMMARY OF THE INVENTION

The present invention enables multiple users from different physical locations to access, observe, control and manipulate physical processes or environments either synchronously or asynchronously over computer networks such as the internet or a private intranet. Providing a unique way to distribute information, this technology consequently brings a new method in sharing information that can be applied in a variety of activities such as distance learning, medical practice, oil exploration, drug development, chemistry, physics, pollution monitoring, weather data collection, and many other fields in which instruments provide data about physical and other processes.

Users that are connected to computer works such as the internet can perform tasks such as controlling devices and processes in real time. By reserving lab sessions through on-line scheduling, users may have secure and exclusive access to the experiment during scheduled periods. Features of the present invention include: live video and data stream. In this feature the user may visually monitor a physical setup and the state of an experiment or environment. Another feature is real-time two-way communication with instrumentation systems. Users may directly control lab instrumentation and receive live feedback regarding the input commands. In another feature real-time computational analysis may be performed. Not only measurement data may be collected into the database, computational analysis i.e. statistics transforms can be generated and displayed as the measurement being collected. In another feature the present invention provides a user interface incorporating an online user notebook. The notebook provides users with the interface to manage user data such as collected data, lab parameters, to-do lists, personal notes, etc.

BRIEF DESCRIPTION OF THE DRAWINGS

The forgoing aspects and many of the attendant advantages of the present invention will become more readily apparent in the following detailed description and accompanying drawings, wherein.

DETAILED DESCRIPTION

Figure 1A:
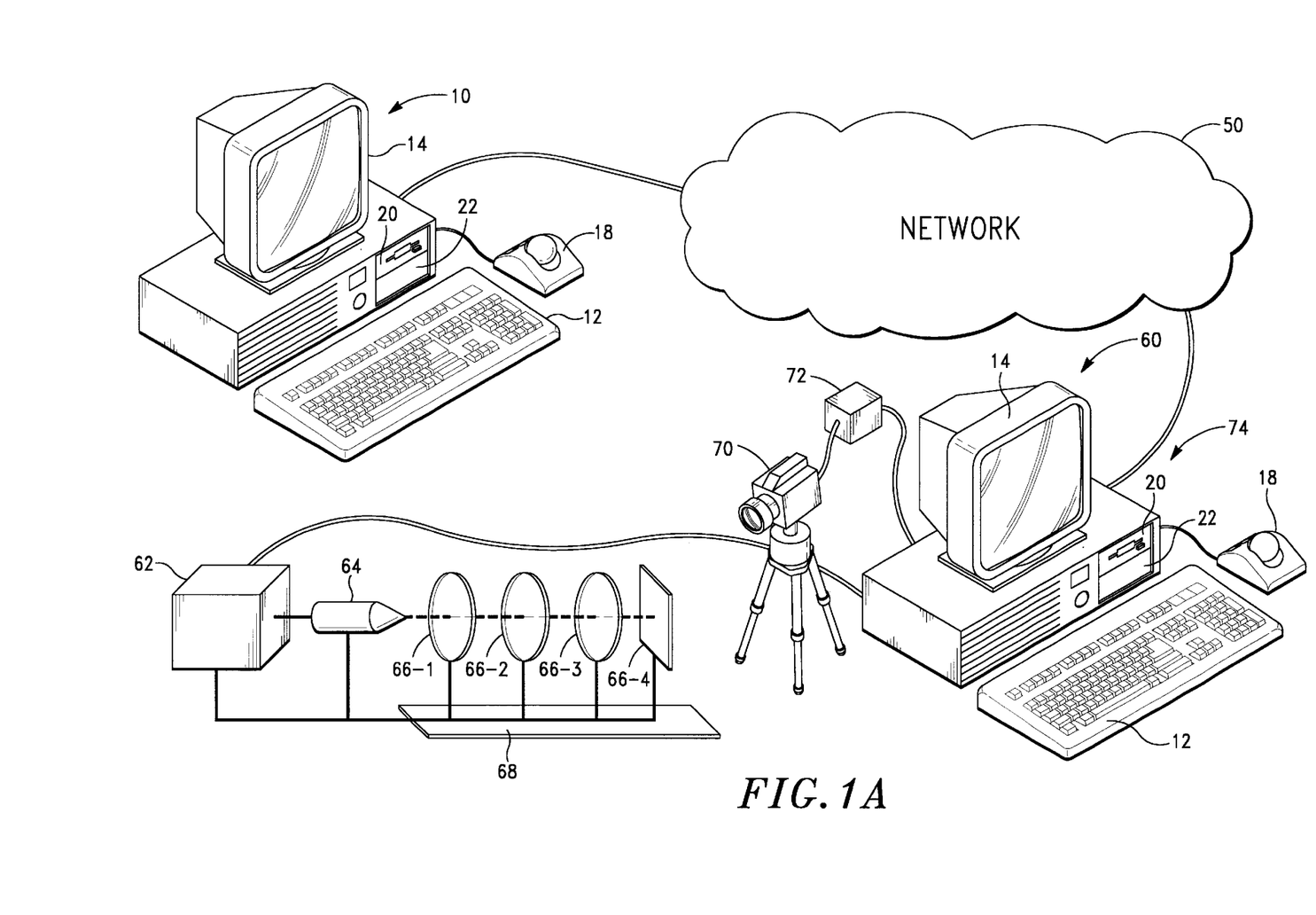
FIG. 1A is a diagrammatic representation of the computer network utilized by the present invention.

FIG. 1A shows a computer 10 connected via a computer network such as Internet 50 to computer 60 that manipulates devices in a laboratory. Computers 10, 60 may have a conventional design, incorporating a processor chassis utilizing a central processing unit (CPU), various memory and supporting integrated circuitry. Connected to the processor is a keyboard 12 and monitor 16. A user may control the computer 10 using the keyboard 12 or mouse 18 to manipulate a cursor moved about on the screen of the monitor 14 to make selections in programs executed on the computer 10. Floppy drive 20 and hard disk 22 may also be incorporated in the computers 10, 60.

Although a desktop type of computer is illustrated in FIG.1, it is to be understood that other forms of computers, such as workstations, laptops, palm tops, dumb terminals, or any computer capable of communicating with other computers may be used in connection with the present invention.

Computers 10, 60 may communicate over the computer network 50 via modem and telephone line. An operating system and browser program may also be included in computers 10, 60 so that a user may access the laboratory. However, other media may also be used, such as a direct connection or high speed data line. The computer network 50, as described above, may be a large and complex system, incorporating a vast number of nodes and components.

Computer 60 is located at a laboratory where physical processes are to be conducted. For illustrative purposes, the operation of a laser and optical equipment is described herein, but it is to be understood that other types of physical processes may be used in connection with the present invention. An interface 62 is connected to the processor in computer 60 that allows a user to control laser 64. The beam from laser 64 may be directed through various optical equipment 66, which may be adjusted on table 68 by interface 62. In an embodiment of the present invention, interface 62 may use a PCI-GPIB board to control and monitor laser 64. To acquire images of the laser beam that have been processed by optical equipment 66, a CCD detector that transmits digitized images to a IMAQ PCI-1424 board may be used. The optical equipment 66 may be mechanically adjusted and aligned by motorized stages on which the equipment is mounted. To display live pictures of the processes and equipment, an IMAQ PCI-1408 board may be used to digitize the analog video signal from camera 70. Motion of camera 70 may be controlled by a motion control system available through a software application such as LabView, which may be stored and executed on computer 60. Camera 70 is provided with frame grabber 72 to provide video feedback of the physical process, and are controlled by the video server 72, which may be executed on the processor of computer 60. System software on computer 60 may also include IMAQ Vision for G that provides image processing libraries such as a Fast Fourier Transform (FFT) routine to speed up development of live data analysis software.

Figure 1B:
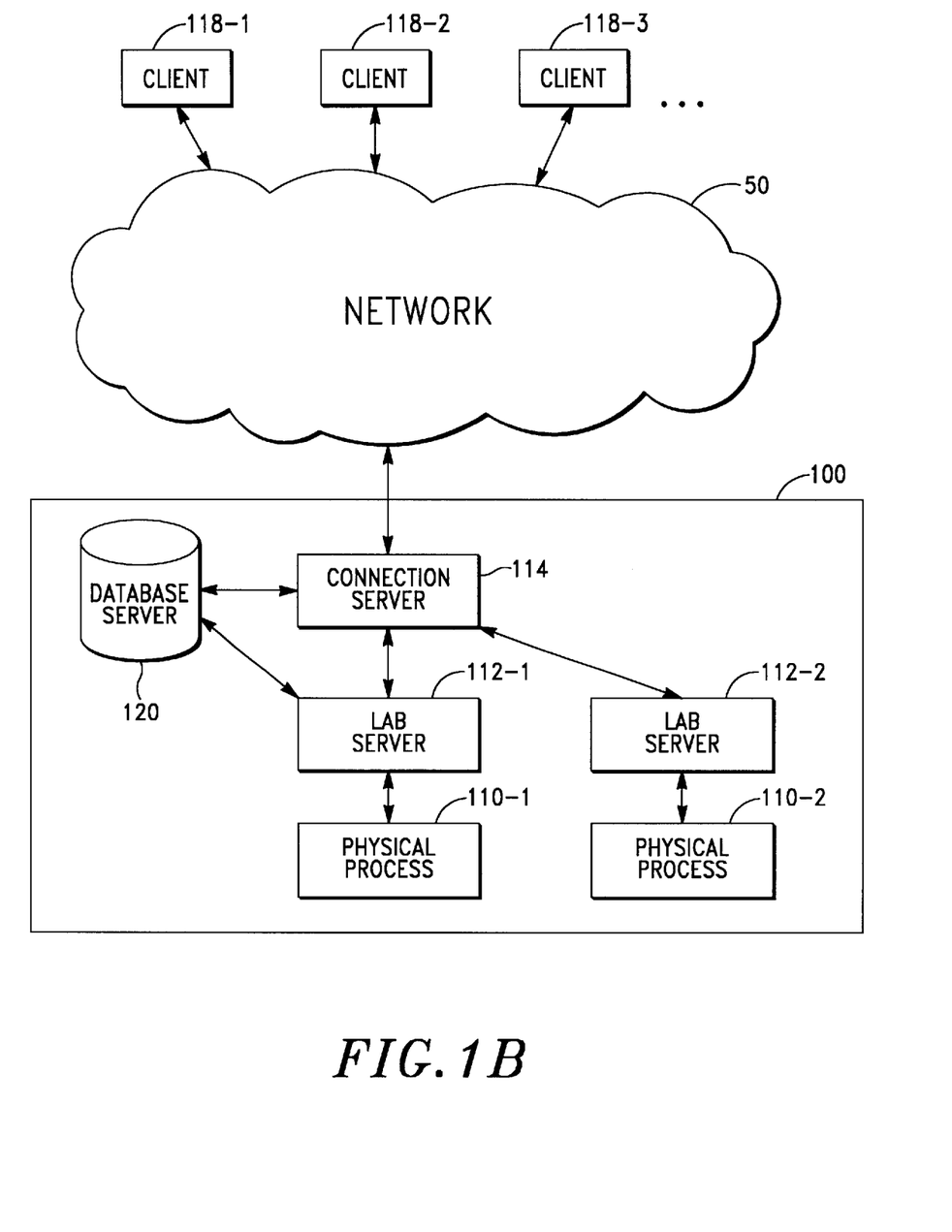
FIG. 1B is a diagrammatic representation in block form of the system architecture of the present invention.

Directing attention to FIG. 1B, the system architecture 100 integrates hardware and software that facilitate two-way communication between physical processes 110 to on-line users across computer networks. The system can be divided into several processes based on functionality: physical processes 110, lab server 112, connection server 114, clients 118, database server 120. These processes can be implemented as software programs that are executed in computing devices such as computers. As used herein, physical processes 110 are defined as physical, biological and/or chemical processes or phenomena that can be detected, measured, quantified and/or controlled by electronic devices such as detectors, sensors, motors, power source, etc. to various interfaces such as GPIB, RS-232, PCI, USB, ethernet, etc., the electronic devices that monitor and control the physical processes 110 and communicate with computer 60 that runs the lab server process 112.

Data from the physical processes 110 are collected by the lab server 112 for purposes of storing into the database via the database server 120 and/or distributing to the clients 118 via the connection server 114. Prior to sending data, the lab server 112 can also perform analysis and transformation of the data such as statistics and FFT computation. The lab server 112 also receives data from the clients 118 such as control commands through the connection server 114. After analyzing these commands, the lab server 112 then passes the commands to the electronic devices or equipment (i.e. laser, motors, detectors, etc.). As shown in FIG. 1B, there are multiple physical processes 110, namely physical process 110-1 and physical process 110-12, as well as multiple lab servers 112-1, 112-2.

The connection server 114 serves as the distributor of data that accepts, verifies and routes information from data sources to appropriate destinations. The connection server 114 supports full duplex point-to-point and point-to-multipoints data transmissions between the clients 118, lab server 112, and database server 120. Several transmission modes will be discussed below. Additionally, the connection server 114 also monitors the status of network connections throughout the entire process.

The clients' processes 118 provide user interfaces (UI) for users' input and output functions. The clients' processes 118 are implemented as software programs that can be run on clients' computing devices such as desktop computers. The client also establishes two-way communications with the connection server 114. Data from the connection server 114 are decoded and displayed according to associated formats such as the video, graph, LED displays, etc.

In a preferred embodiment, communications between the processes above are carried out using a common language, such as Data Network Protocol (DNP). Besides transporting various data types, DNP also carries network and communications related messages between different processes. DNP packet format is also discussed in the later sections.

The lab server 112 may reside at the location of the physical process 110 to have direct local control of the physical process. The lab server 112 is the that broadcasts data from the physical process 110 and well as control the physical process 110 based on requests from clients 118. The lab server 112 can be implemented as a multi-threaded software that implements communication functions across computer networks such as the internet 116. To provide universal and reliable communications, all data can be transported using standard connection based network protocols such as Transmission Control Protocol/Internet Protocol (TCP/IP). Each connection (in this case between the lab server process 112, connection server process 114, and clients 118) is commonly called socket that consists of a network or IP address and a port number. However, the data itself and other communication messages are encoded in a format called Data Network Protocol (DNP). In the OSI network model, DNP can be considered as an application layer protocol like HTTP and FTP. The unique design of DNP provides a common language between different processes that enables collaborative environments between multiple users across the internet.

Figure 2:
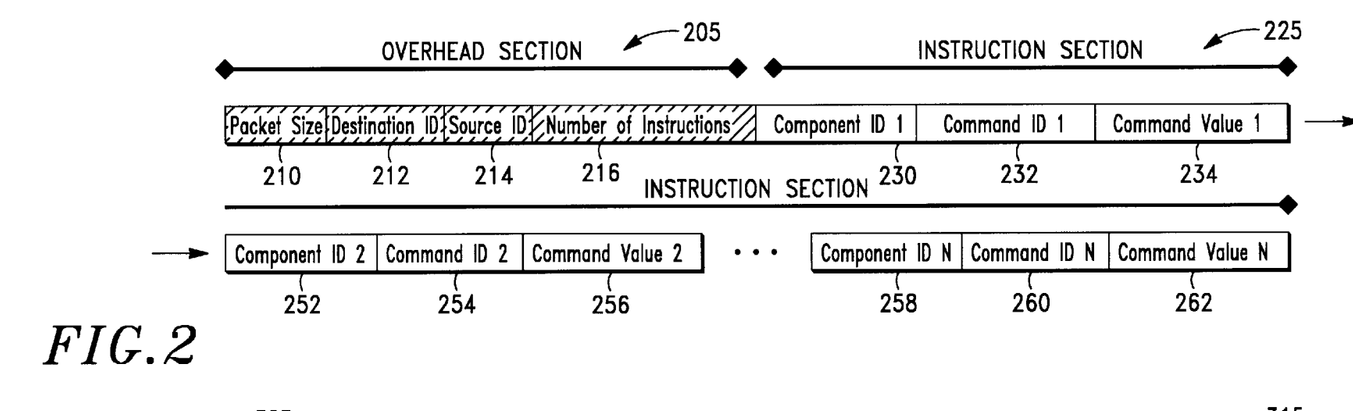
FIG. 2 illustrates the DNP packet format utilized in the present invention.

DNP is designed to carry various types of digital data such as float, integer, Boolean, video and arrays of data. Data is encoded using DNP into one information entity called a packet that has two main sections: the overhead section 205 and instruction section 225. Directing attention to FIG. 2, the DNP packet format is illustrated. The overhead section 205 may contain the following fixed-size fields:

Packet size 210: the length of the entire packet normally in byte words (8 bits unit).

Destination ID 212: may contain client ID, lab server ID, connection server ID, all-clients-group ID, all-clients-and-lab-server-group ID, or connection server group ID where the packet is sent.

Source ID 214: may contain client ID, lab server ID or connection server ID where the packet is originated.

Instruction number 216: contains the number of instructions following the overhead section 205. For example in FIG. 2, there are N instructions.

The instruction section 225 may contain a number of instructions. Each instruction can be a specific command or request that contains the following fields.

Component ID 230: identification number of specific device/equipment for user interface component.

Command ID 232: identification number of specific command/request to be performed.

Figure 3:
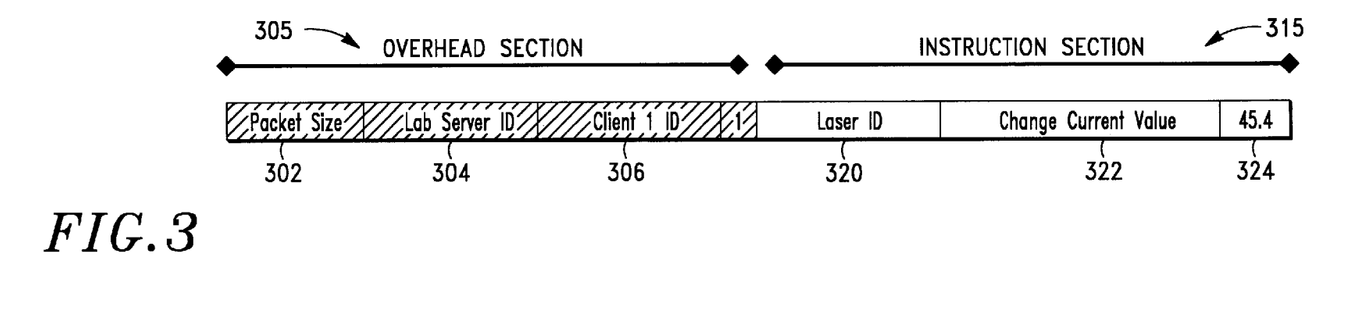
FIG. 3 shows a packet sent from a client process to a lab server.

Command Value 234: parameter values used to perform the commands or requests. Based on the associated command/request, the data type of common values can vary (i.e. float data, integer data, video data, array of data). Consequently this field has variable size. Both sender and receiver of the request may have a look-up list of data types associated with the component ID's and command ID's. Hence, the data type information need not be carried in the packet itself. The instruction section may be extended to include component ID's, command ID's and command values 252–262. FIG. 3 shows an example packet sent from a client 118 to a lab server 112 that is a request to change the current value of laser equipment to 45.4 mA. In overhead section 305 there is a packet size section 302, a lab server ID section 304 and a client ID section 306. In instruction section 315 there is a laser ID section 320, a change current value section 322 and the target milliamps 45.4 in section 324.

Figure 4:
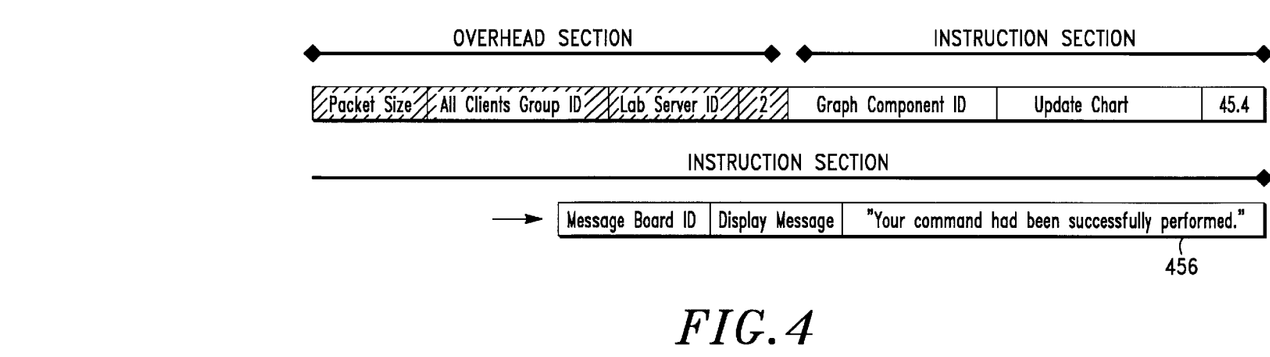
FIG. 4 shows a response packet sent from the lab server 112 to a client process.

FIG. 4 shows a typical response packet from the lab server 112 to all clients 118 to update two of their user interface components: a graph and message board display with a value of 45.4 and a message in message section 456 which reads, "your command has been successfully performed."

Two main functions may be performed by the lab server: broadcast data from the physical processes 110; and perform clients' requests and general associated responses. To keep clients 118 up to date with the current states of the physical processes 110, the lab server 112 can broadcast information that is directly collected from the physical processes 110. Data from the physical processes 110 that are encoded in the DNP packet are transmitted to connections server 114 for distribution. The connections server can then look at the overhead section of the transmitted DNP packet and forward the packet to appropriate destinations. Details on the routing algorithm in the connections server are discussed below.

Sensors, detectors and other measurement instruments detect and/or measure various physical phenomena (i.e. electric fields, electromagnetic radiation, temperature, pressure, etc.), and send this information to the lab server 112. The lab server 112 that has established network connection to the connections server 114 can then put the received information or its computed analysis into the instruction section of the DNP packet. This process can be repeated if more than one instruction is needed to be sent. Once all the instructions have been written in the instruction section of the DNP packet, the corresponding overhead sections can also be constructed. Once the DNP packet is complete, it can then be sent to the connections server 114.

Figure 5:
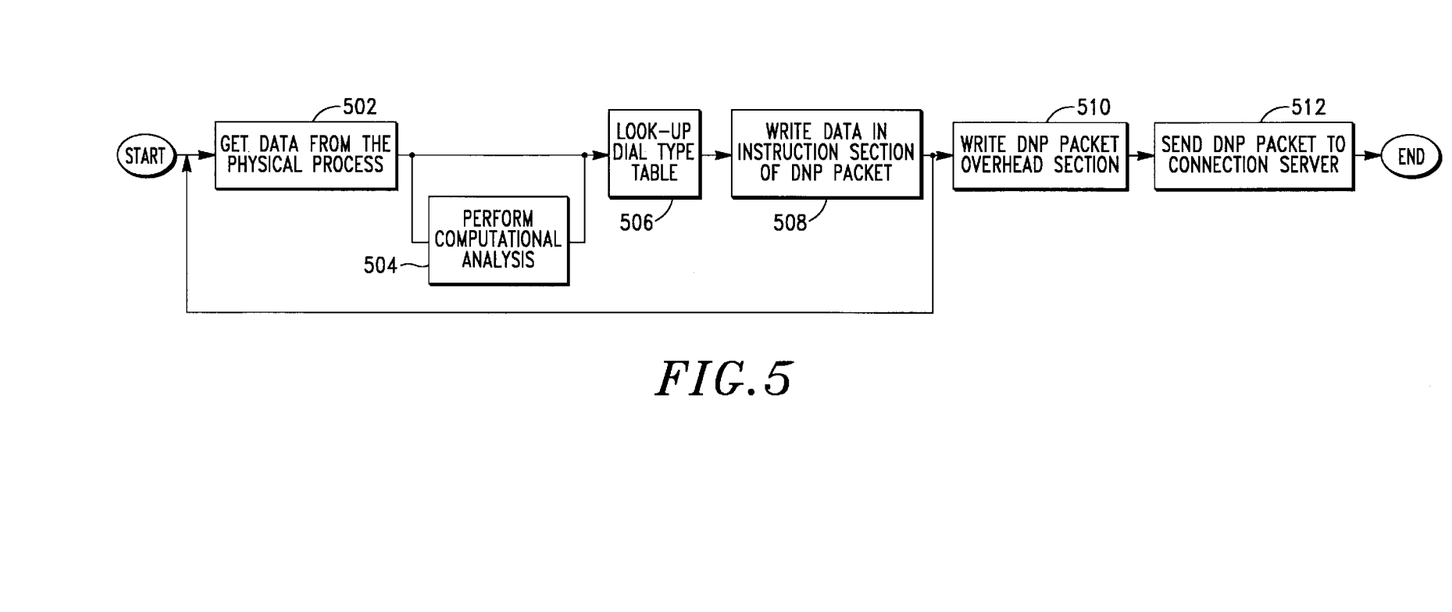
FIG. 5 is a flow chart illustrating the logical sequence of steps for the lab server to transmit raw data from physical processes for calculating results based on computational analysis of the raw data.

Directing attention to FIG. 5, the lab server 112 can broadcast the raw data from physical processes 110 for calculating results based on computational analysis of the raw data. In some cases, data from the physical process 110 are analyzed for the purposes of scientific visualization, statistical analysis or data compression. For example, raw video data from the physical process are analyzed for both spatial and temporal redundancy. After performing a compression algorithm, the compressed format of the video data is written to the instruction section of the DNP packet. Video compression that is suitable for this application is described below. For the clients to receive a continuous update of information the entire process in FIG. 5 can be repeated on a periodic basis. The repetition period of this process can be adjusted according to a particular application. At step 502 the lab server 112 gets data from the physical process 110. Control may proceed to optional step 504, where the lab server 112 performs computational analysis. Control proceeds to step 506 where a look-up data type table is constructed. Control proceeds to step 508 where data is written in the instruction sections of the DNP packet. This may be part of an iterative loop where control returns to step 502. Control may also proceed from step 508 to step 510 where the DNP packet is written to the overhead section. Control continues to step 512 where the DNP packet is sent to the connections server 114.

Figure 6:
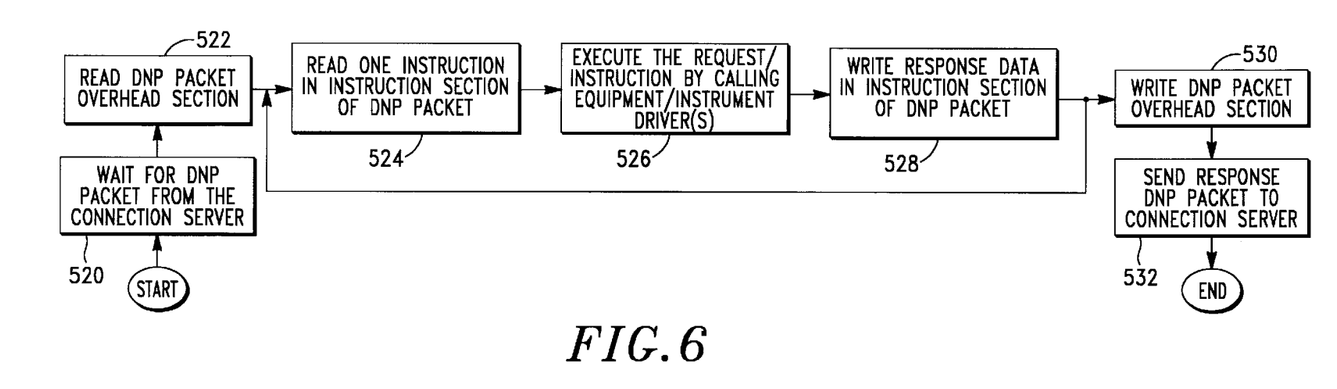
FIG. 6 is a flow chart illustrating the logical sequence of steps for the lab server to interpret client instructions, execute the commands and generate responses.

Another function of the lab server 112 is to process clients' requests and generate associated responses. The lab server 112 can receive a DNP packet from the connections server 114 that contains the clients' requests for instructions. It is the responsibility of the lab server 112 to interpret these instructions, execute the commands and generate responses. This process is in FIG. 6. Control begins at step 520 where the lab server 112 waits for the DNP packet to be received from the connections server 114. Proceeding to step 522, the overhead section of the DNP packet is read. Control continues to step 524, where one instruction in the instructions section of the DNP packet is read. Control proceeds to step 526, where the lab server 112 executes the request/instruction by calling equipment/instruction drivers. Control proceeds to step 528, where the lab server 112 writes response data in the instruction section of the DNP packet. From step 528, control may return to step 524 in an iterative loop according to the number of instructions; control may also proceed to step 530, where the DNP packet is written to the overhead section. Control proceeds to step 532, where a response DNP packet is sent to the connections server 114.

Execution of a client's requests may involve calling particular software drivers that send the commands to instruments via the associated computer interface such as GPIB, RS-232, USB, ethernet, etc. The request may also contain instructions for information management such as recording the client's request, storing collected values from instruments, and querying previously collected information. In the case of information management, the lab server 112 can interact directly with local or remote database servers through standard database drivers such as ODBC or JDCB.

Unlike the broadcasting functions that may continuously send DNP packets to clients, this function of the lab server 112 only generates responses when client requests are received. When the lab server 112 is implemented in a software program, this function may be run in a separate thread for parallel processing with other functions.

The connections server 114 can be run in the same computer where the lab server 112 resides. For additional reliability, in the preferred embodiment the connections server 114 may be executed in a separate computer. The connections server 114 may be implemented using object oriented, network-enable and multi-threaded software development environments such as JAVA or C++. Two of the main functions performed by the connections server 114 include: monitoring and maintaining reliable network connections with all active clients and lab servers; and routing DNP packets to appropriate destinations.

The connections server 114 maintains network connections with all the processes, namely: lab server 112, database server 120, and clients 118. A connection handler, which may be a class or object in object-oriented programming terminology, can perform readings from and writing to each of the connections. Each connection handler should be run in a separate thread for parallel processing. Once the connections server 114 accepts or establishes a connection, it can then pass the connection information (i.e. the socket information that contains remote post address and remote port number) to the connection handler for further processing. The connections server 114 maintains an array or table of connection handlers, namely the connection table, to perform and monitor network related processes. A connection monitor is another important process included in the connections server 114 that runs on a periodic basis. The connection monitor may be implemented as a subclass of the connections server 114 and may be executed in a separate thread. A function of the connection monitor is to monitor and control the network communications of the processes (i.e. clients 118 and lab server 112) connected to the connections server.

Figure 7:
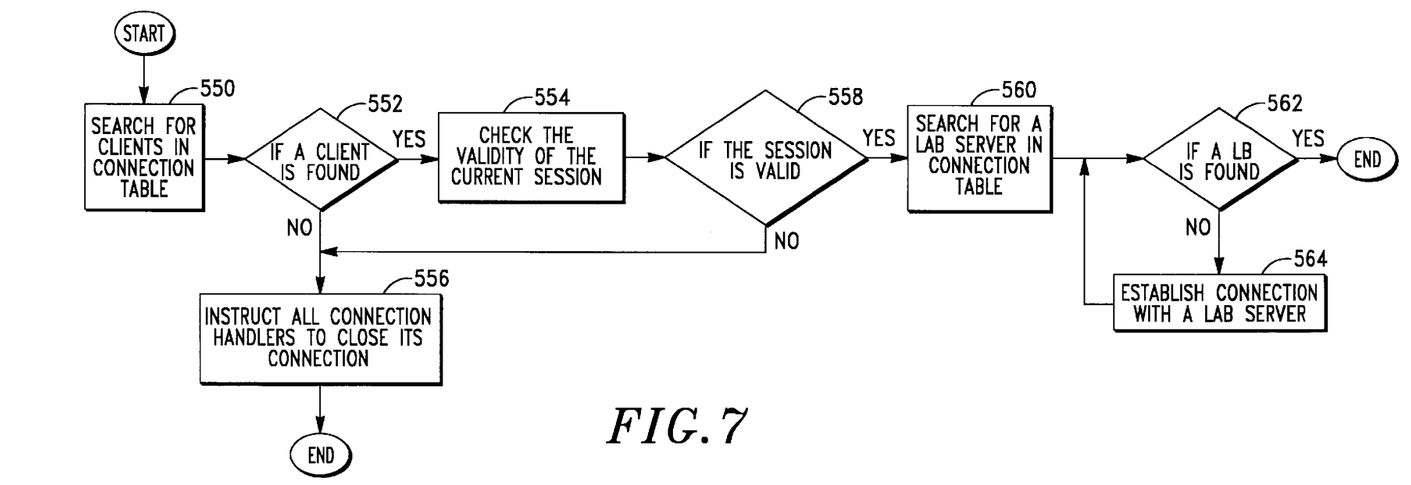
FIG. 7 is a flowchart illustrating the basic operation of the connection monitor.
Figure 8A:
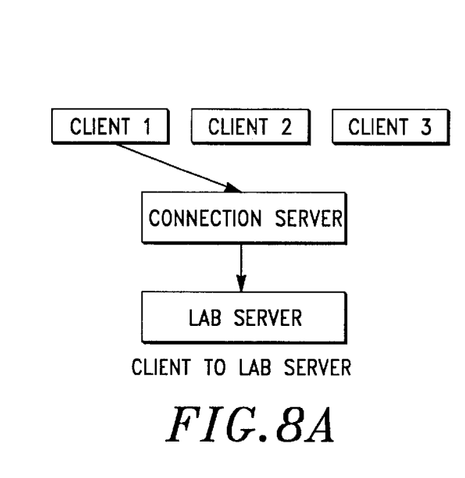
FIGS. 8A, 8B, 8C, 8D, 8E and 8F display several routing modes that may be performed by the connections server.
Figures 8B, 8E:
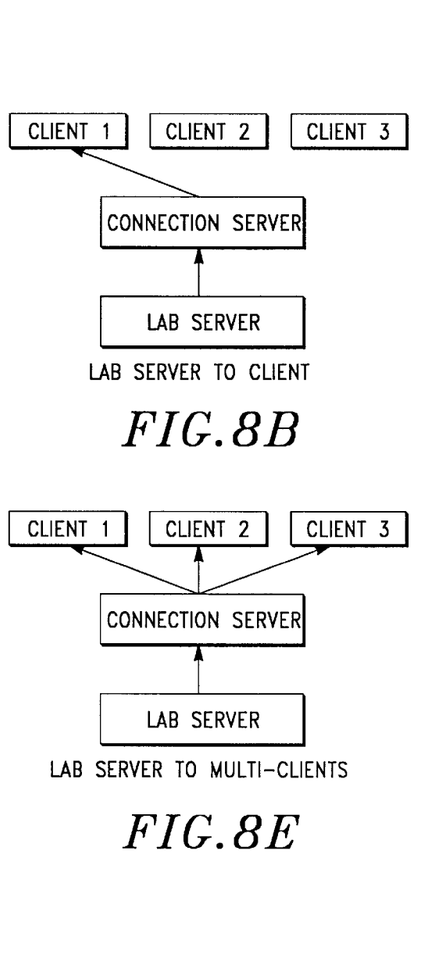
Figures 8C, 8F:
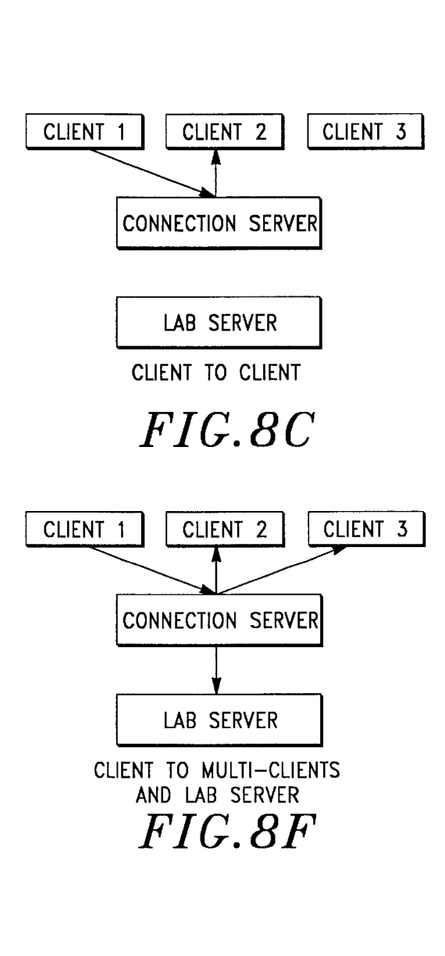
Figure 8D:
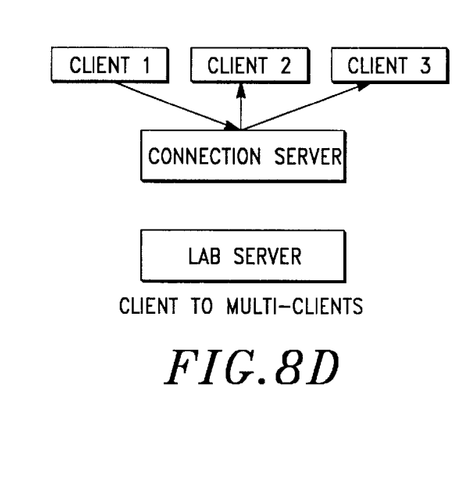

FIG. 7 illustrates the basic operation of the connection monitor. Beginning at step 550, the connection monitor searches for clients in the connection table. Proceeding to decision step 552, if a client is found in the connection table, control proceeds to step 554 where the connection monitor checks the validity of the current session. This operation is normally done by consulting the database server 120 to check whether the current clients have access to the physical process 110. If a client is not found, control proceeds from decision step 552 to 556, where the connection monitor instructs all connection handlers to close their connections. Returning to step 554, control proceeds to decision step 558. If the session is valid, control proceeds to step 560; otherwise control returns to step 556. At step 560, the connection monitor searches for a lab server 112 in the connection table. Control proceeds to decision step 562, where, if a lab server is found, the program terminates. Otherwise, control proceeds to step 564, where the connection monitor establishes a connection with a lab server 112. As shown in FIG. 7, the operation of checking whether a lab server 112 is connected is performed in a loop, since there may be more than one lab server 112 contacted for backup purposes. If a failure in the system or device at the physical processes 110 occurs, the lab server 112 that is physically connected to the physical process 110 would refuse any connection requests from the connection server. Thus, the connection monitor attempts to establish connection with another lab server 112. The entire operation in FIG. 7 should be performed periodically to continuously monitor the communication process.

The connections server serves as the distributor of data that accepts, verifies and routes DNP packets to appropriate destinations. The connections server supports full duplex point-to-point and point-to-multipoints data transmissions based on the destination ID field of the DNP packet. As a result both clients 118 and lab server 112 processes may synchronously receive events that are generated by any processes. FIGS. 8A, 8B, 8C, 8D, 8E and 8F display several routing modes that may be performed by the connections server. FIGS. 8A through 8F are an example case of three clients and a lab server connected to the connections server. The maximum number of clients that may be served varies according to the available network bandwidth.

Figure 9:
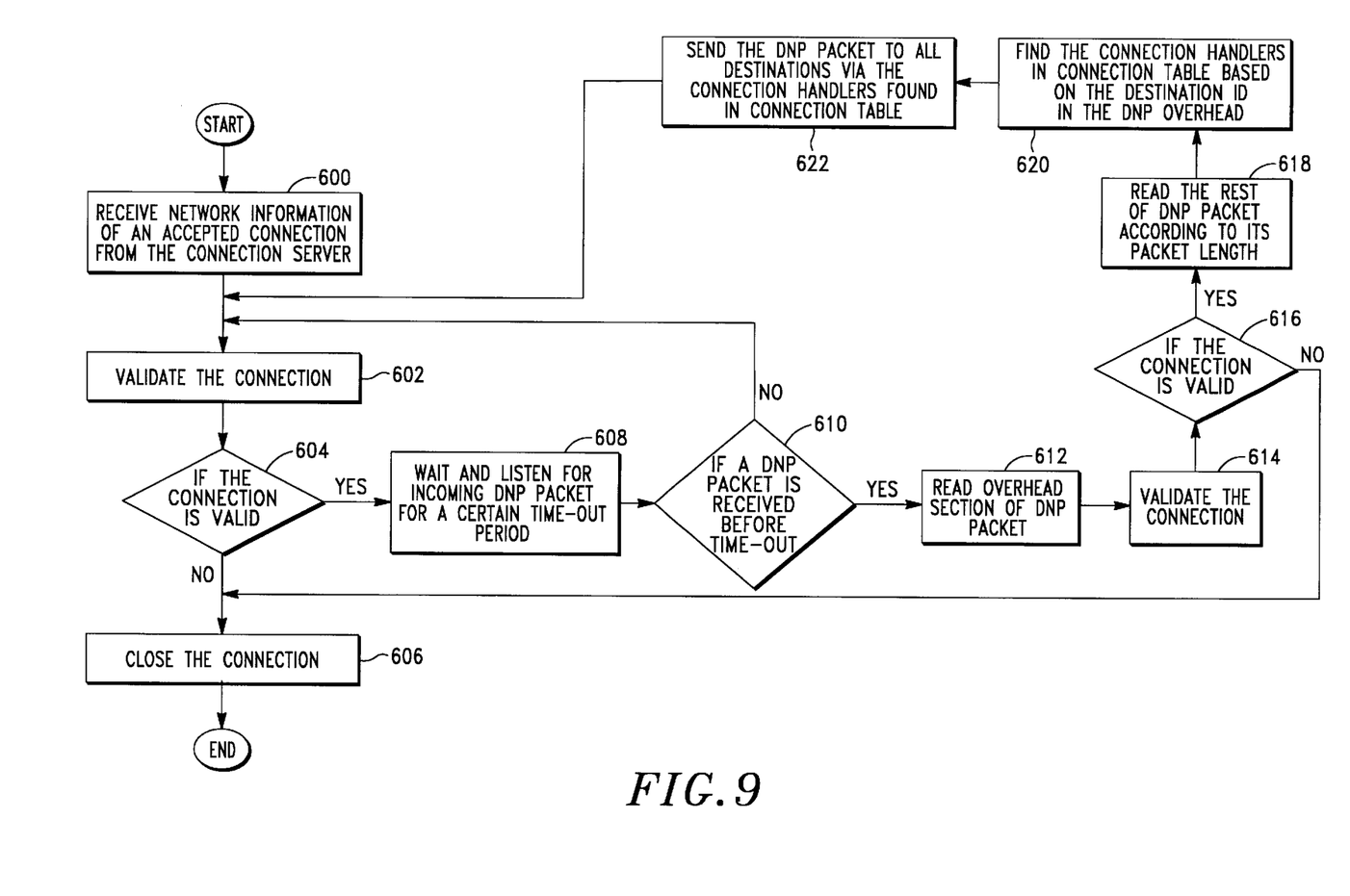
FIG. 9 is a flowchart illustrating the basic operation of the connection handler.

As discussed above, the connection handler is part of the connections server and may perform reading from and writing to each connection. The connections server 114 listens to any connection request, and passes the network information to the connection handler once a valid connection is established. FIG. 9 shows the flow diagram of the connection handler. Beginning at step 600, the connection handler receives network information from an accepted connection from the connections server. Control proceeds to step 602, where the connection handler checks to see if the connection is valid. If the connection is not valid (decision step 604), control proceeds to step 606, where the connection handler closes the connection and control terminates. However, if the connection is valid, control proceeds to step 608, where the connection handler waits and listens for incoming DNP packets for a certain time-out period. From step 608, control proceeds to decision step 610. At decision step 610, if a DNP packet is received before the time-out, control proceeds to step 612, where the overhead section of the DNP packet is read. However, if a DNP packet is not received before the time-out, control returns to step 602. From step 612, control proceeds to step 614, where again the connection handler attempts to validate the connection. If the connection is not valid (decision step 616), control returns step 606. However, if the connection is valid, control proceeds to step 618, where the rest of the DNP packet is read according to its packet length. Control then proceeds to step 620, where connection handlers in the connection table are found based on the destination ID in the DNP overhead section. Control then proceeds to step 622, where all DNP packets are sent to all destinations via the connection handlers found in the connection table. From step 622 control returns to step 602. The operations described above are repeated until the connection is no longer valid.

Client processes provide a graphical user interface for the end users of the physical process 110. The clients may be implemented in any object-oriented and network-enabled software development environment such as C++ or JAVA. The client should contain graphical components that may be used for getting user inputs and/or display information. Some of the components may include dials, graphs, switches, LED displays, buttons, etc.

The client process 118 may be executed from any computer that is connected to a TCP/IP network such as the internet. When the client process is run, it will first attempt to establish network connections to the connections server 114. User requests/commands that are received from the UI components are encoded into DNP packets to be sent to the connections server 114. The client 118 may also process DNP packets from other remote clients and lab servers 112 that are received via the connections server 114. This operation may also be executed in a separate thread for parallel processing.

Figure 10:
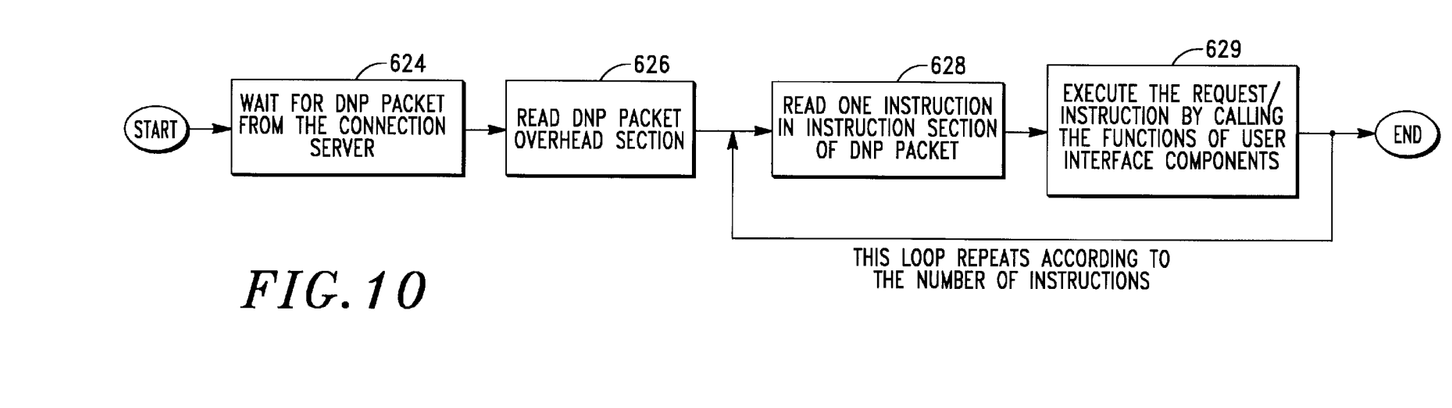
FIG. 10 is a flowchart illustrating client DNP packet processing.

FIG. 10 is a flow diagram of a client DNP packet processing. The client process 118 normally executes the instructions in a DNP packet by calling functions or methods of its UI components. The instructions may involve updating the graph display, turning a dial, decoding and displaying video data, etc. By receiving live events from physical processes 110 and other client processes, the user may experience an interactive and collaborative environment in controlling remote physical processes. Beginning at step 624, the client waits for DNP packets from the connections server 114. Control then proceeds to step 626, where the DNP packet's overhead section is read. Control then proceeds to step 628, where one instruction in the instruction section of the DNP packet is read. Control then proceeds to step 629, where the request/instruction is executed by calling the functions of the user interface components. From step 629, control may return to step 628 in a loop that repeats according to the number of instructions.

The database server 120 manages a database containing information that is essential to the operation of other processes. The remote operation of the database server 120 can be facilitated using database application programming interface standards such as ODDC or JDDC. The database server 120 manages the following list of information: user information, user physical process data, scheduling information, and event data.

The database server 120 manages user profiles. A user profile contains user accessed information such as log-in name and password that enables the connections server 114 to verify connection requests from the clients 118. In addition, the user profile also includes the client's progress information by tracking the status of accomplished actions/requests. Data from the physical processes 118 (i.e. sensor readings, states of equipment, etc.) may also be recorded on behalf of a client's request. This data be time stamped and may be made available to the user via an interactive "laboratory notebook" user interface. Using a common gateway interface (CGI) or JAVA servlet program that may interact with the database server 120, clients may search and retrieve previously recorded physical process data. The search may be based on chronological order, keyword, or other characteristics of the recorded data. Scheduling information ensures that only the appropriate clients are given access to the physical processes 110 in a certain time period. Every event received by the lab server may also be automatically recorded. This data may be used to analyze clients' behavior and usage patterns in controlling the physical process 110. The interactive laboratory notebook may also contain lab parameters, "to do" lists, and personal notes.

The interactive laboratory notebook is part of a user interface that may be constructed using Interface Builder or similar software application, and may be accessed by users during the course of an experiment. The interactive laboratory notebook may be implemented to include a database stored on a hard disk or other nonvolatile memory of computer 60, as well as a user interface to access the database. Where the present invention is utilized for distance learning, the laboratory notebook provides a central repository for information and is an essential tool for instructors to evaluate the progress and performance of students using the online laboratory.

The user interface may include animated switches, dials, buttons, and LED displays rather than traditional browser forms. Online graphing of the real time data along with other customized user interface components allows users to experience a hands-on look and feel. The user interface may closely resemble the front panels of the actual instruments in functionality, layout, and appearance. The live video stream may also be included in the user interface.

Real Time Video Observation

Observing physical processes in real time via the internet is a key feature of the present invention. Returning to FIG. 1B, video camera 70 is used to acquire live images from a system that the user interacts with and whose actions affect the observed video. Video capture (or frame grabber) hardware 72 is used on a computer to capture images desired to be sent to the user with minimum latency. A video server computer 74 compresses new image data and forms packets to be transmitted to the user (client) through the computer network 50. The client, using a standard browser, is able to view the live video and interact with the system. In order to transmit video via the internet in real time, spatial and temporal compression is performed. In spatial compression, the acquired image from frame grabber 72 is represented as gray-scale or as a color image in terms of hue, saturation, and value (HSV). In both cases values are represented as integers. The image data is divided into square blocks (8×8 pixels or 16×16 pixels, for example). A two-dimensional discrete cosine transform (a standard mathematical operation often abbreviated as DCT) is performed on each block.

To perform temporal compression, the server 74 subtracts the ideal DCT data from the DCT data that the client currently holds. This difference in DCT data is the information that the client must receive in order to allow its video to be updated to the desired image. This compression uses a single new frame to calculate data to be sent. This sacrifices compression efficiency (i.e. that obtained using the MPEG4 standard) in order to minimize latency. An approximation to this difference is calculated which meets the requirements of the specified fixed packet size (specified in bits). By basing compression on a specified packet size, compressed video matches transmission limitations of the client 110. The data rate (PACKET_SIZE*PACKETS_PER_SECOND) that is used for a particular client is dynamically determined and updated as video is sent. This allows the quality of video that is sent to a client to vary according to the abilities of each client's internet connection. This also allows the data rate to vary in response to changes in a client's allowable data rate. By having the client intermittently inform the server of the times that it received transmitted packets, the latency and allowable data rate of the client may be calculated.

Figure 11:
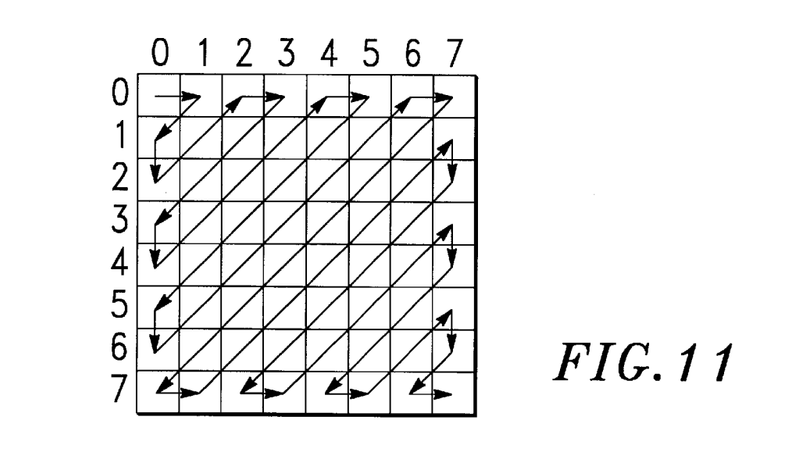
FIG. 11 is a diagrammatic representation of a two-dimensional set of DCT components.

FIG. 11 shows the two-dimensional set of DCT components. Component 0 is in the upper left corner, and the path of the arrow shows the order that each component is enumerated. DCT components are transmitted in groups of components (i.e. eight groups of eight components). Not all groups of DCT components are transmitted in a single packet. Groups of "difference in DCT data" are chosen to be sent based on the magnitude of the components in the group. In eight SV images, the eye is more sensitive to differences in value than to differences in hue or saturation. Thus a relative weight is used in comparing the magnitudes of groups or of a different type. Data is transmitted with rounding in order to use fewer bits to transmit an approximation of the data. The video compression system has been optimized to minimize response time (latency). This priority is unique for a system that depends on the user promptly receiving video feedback in response to his actions.

Figure 12:
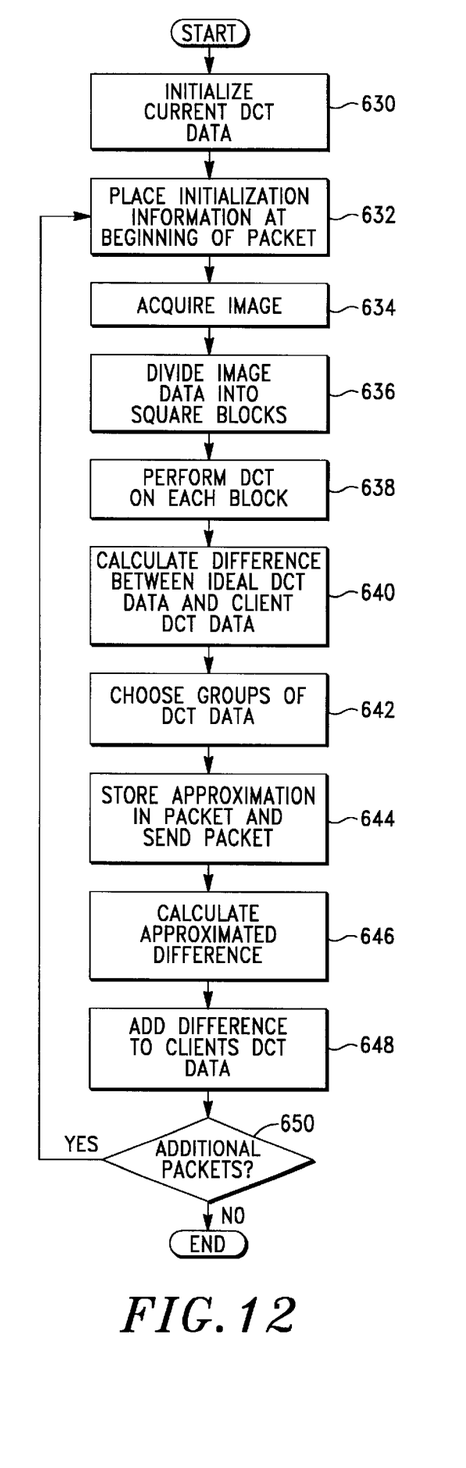
FIG. 12 is a flowchart illustrating the logical sequence of steps executed by the server for performing the encoding process.

FIG. 12 illustrates the encoding process performed by the server 74. Beginning at step 630, the current DCT data for the client is initialized to zero. Control proceeds to step 632, where, if this is the first packet being transmitted, then initialization information is placed at the beginning of the packet. This initialization information includes: width of display, height of display and type of display (gray-scale or HSV). Control proceeds to step 634, where an image is acquired using video camera 70 and frame grabber 72. At step 636, image data is divided into square blocks (8×8 pixels or 16×16 pixels). At step 638 a two-dimensional discrete cosine transform is performed on each block. This produces the ideal DCT data which corresponds to an image with minimal error. At step 640, the difference between ideal DCT data and the DCT data that the client is currently using is calculated. This produces "difference in DCT data". At step 642 groups of "difference in DCT data" are chosen to be sent based on the magnitude of the components in the group. In HSV images, the eye is more sensitive to differences in value than to differences in hue or saturation. Thus a relative weight is used in comparing the magnitudes of groups that are of a different type. At step 644 an approximation to the data in these groups is stored in a packet which is then transmitted over the network through a socket connection with the client. Control proceeds to step 646, where the "approximated difference in DCT data" that the client will decode is then calculated by the server 74. At step 648, this difference is then added to the client's DCT data that the server 74 keeps a record of. By keeping track of the client's current data, the error caused by approximation does not propagate as multiple transmissions are sent. If there are additional packets (decision step 650) control may then return to step 632 in order to produce another packet to be sent to the client.

Figure 13:
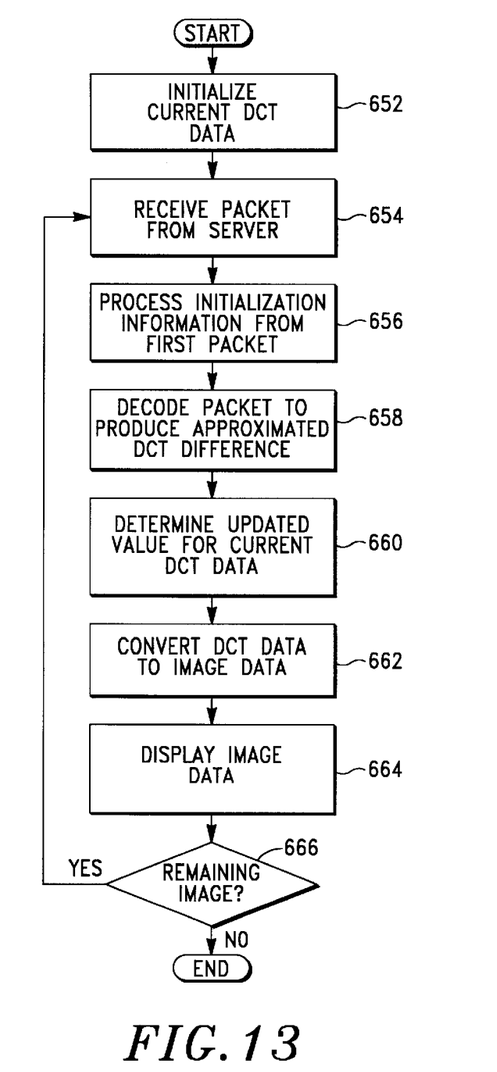
FIG. 13 is a flowchart illustrating the logical sequence of steps executed by the client process for performing the decoding process.

FIG. 13 illustrates the structure of the decoding process performed by the client. Beginning at step 652, the current DCT data is initialized to zero. At step 654 a socket connection is used to receive a packet from the server 74. At step 656, if this is the first packet received, initialization information is processed. This initialization information includes: width of display, height of display and type of display (gray-scale or HSV). At step 658, the packet is decoded to produce the approximated difference in DCT data. At step 660, by adding this difference back to the current DCT data, the updated value for the current DCT data is determined. Control proceeds to step 662, where the inverse discrete cosine transform is then used to convert DCT data into image data. This transformation is only performed on blocks that have been modified by the approximated difference in DCT data. This allows the image data to be updated with no buffering, and thus the delay in updating the image is minimized. Control proceeds to step 664, where the image data is displayed to the user through a standard browser. If there is a remaining image (decision step 666), control may then return to step 654 in order to process an additional updated image sent from the server 74.

The instructions described above as well as the user interface and interactive laboratory notebook may be implemented in software and stored in the computer 60 and executed in accordance with the preferred embodiment of the present invention.

While the description above explains the operation of a laser and optical equipment, it is to be understood that a wide variety of physical processes may be performed using the present invention, and other forms of data may be recorded such as time, temperature, voltage, current, magnetic field, electromagnetic radiation, and the like. Additional applications of the present invention may extend to entertainment, for example the remote control of toys in an interactive setting, where multiple users may access computer 60 via the computer network 50 and play games involving multiple users. The real time video taught by the present invention is an integral part of such an application.

In other applications of the present invention, computer 60 and camera 70 may be utilized as a sales or development tool to demonstrate equipment or processes to prospective clients, customers, or developers by providing a demonstration of the equipment or processes in real time and eliminating the expenditure of resources required to travel to a location where the equipment or processes are located.

While the present invention has been described in connection with the preferred form of practicing it, those of ordinary skill in the art will understand that many modifications may be made thereto without changing the scope of the claims that follow. Accordingly, it is not intended that the scope of the invention in any way be limited by the above description, but instead be determined by reference to the claims that follow.

What is claimed is:

1. A system for remote physical process access and operation, comprising:

a laboratory server operatively coupled to at least one said physical process and configured to monitor and control said physical process;

at least one client process, said client process configured to provide control instructions to said physical process and to receive data from said physical process, wherein said data is dynamic data which comprises a live image of said physical process;

a connection server operatively coupled to said laboratory server and said client process, said connection server configured to route said control instructions from said client process to said laboratory server and to route said dynamic data from said laboratory server to said client process via said computer network;

a video camera positioned in association with said physical process, said camera operatively coupled to said connection server and configured to transmit an image of said physical process to said client process via said connection server; and a video server operatively coupled to said video camera and said connection server, said video server configured to acquire said live image of said physical process.

* * * * *